Nov. 18, 1958  J. R. SILVER  2,860,436
TIRE CENTER SIGN CONSTRUCTION
Filed Dec. 14, 1955  2 Sheets-Sheet 1
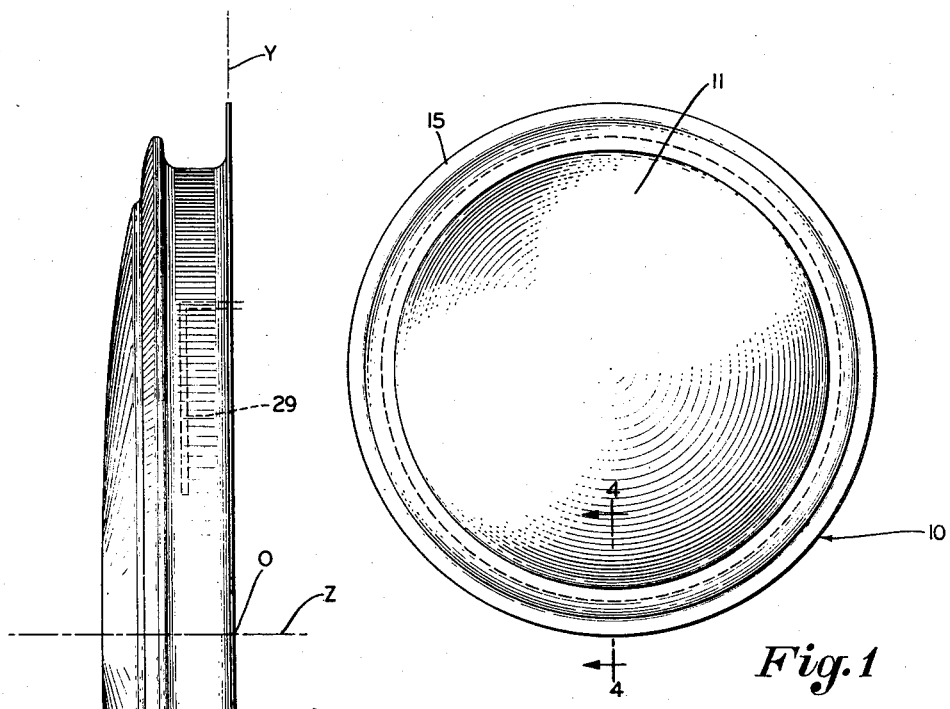
Fig. 1
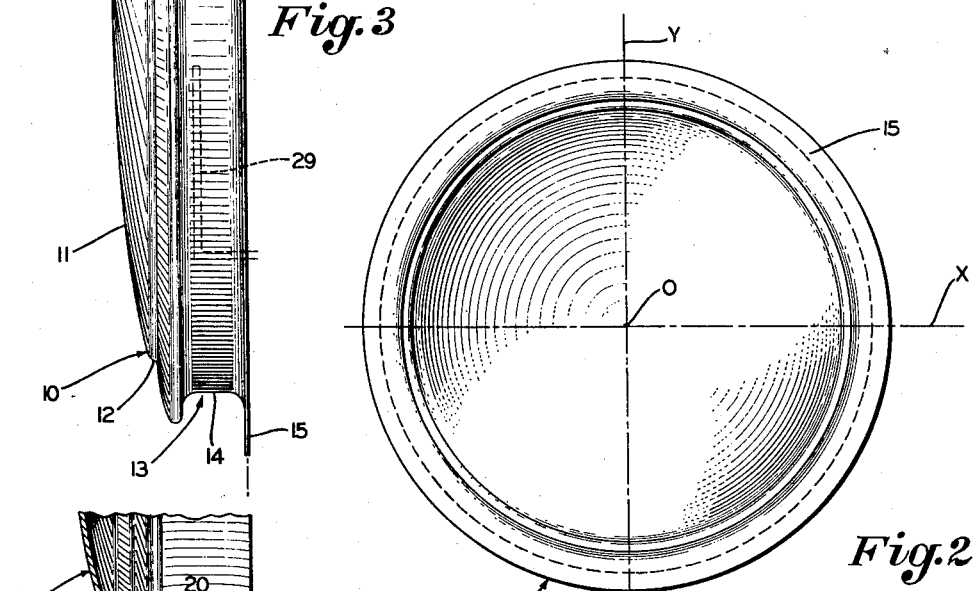
Fig. 2
Fig. 3
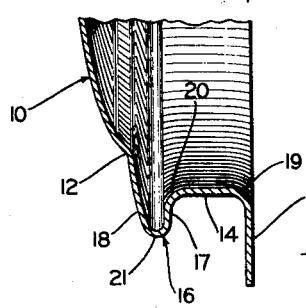
Fig. 4
INVENTOR.
Joseph R. Silver
BY
Frease & Bishop
ATTORNEYS Nov. 18, 1958  J. R. SILVER  2,860,436
TIRE CENTER SIGN CONSTRUCTION
Filed Dec. 14, 1955  2 Sheets-Sheet 2

INVENTOR.
Joseph R. Silver
BY
Frease & Bishop
ATTORNEYS

United States Patent Office 2,860,436
Patented Nov. 18, 1958

2,860,436

TIRE CENTER SIGN CONSTRUCTION

Joseph R. Silver, Akron, Ohio, assignor to The Massillon-Cleveland-Akron Sign Company, Massillon, Ohio, a corporation of Ohio Application December 14, 1955, Serial No. 553,078

1 Claim. (Cl. 40—125)

The invention relates to tire center sign construction for use as an advertising auxiliary attachable to a motor car tire which may be a tubeless tire or a casing for an inner tube, said advertising auxiliary commonly covering the entire center opening of the tire.

Prior to the present invention, many different constructions of tire center signs have been in use, some having bodies made of cardboard, and others having bodies made of metal or other material. Prior tire center signs having included in addition to sign bodies, attaching parts connected with the bodies. In attaching such a prior tire center sign to a tire, it has been necessary to cover the tire bead center opening at one side of a tire with the sign body and manipulate the attaching parts on the rear of the sign body through the opening of the other tire bead. The attaching parts are manipulated to engage the tire bead around the opening covered by the sign body.

In addition to the difficulty of manipulating the attaching parts of such prior tire center signs, these signs cannot be used on both sides of the tire for counter display purposes, and have not been made of translucent or transparent material adapted to be lighted from the rear of the sign when installed in a tire.

The objects of the present invention include the provision of an improved construction particularly adapted for use as a tire center sign, and which includes a sign body and requires no manipulation of parts on the rear of the sign body to attach the sign to the tire bead engirdling a tire opening covered by the sign body.

Further objects of the present invention include the provision of such an improved tire center sign construction, and which can be installed in the opening engirdled by either bead of a tire from either front or exposed side of the tire.

Further objects of the present invention include the provision of such an improved tire center sign construction, and which is adapted to be made of translucent or transparent material to enable lighting or illumination of the sign body from the rear.

Further objects of the present invention include the provision of such an improved tire center sign construction, and which is adapted to be made as a one-piece article of plastic material.

The foregoing and other objects are attained by the improved tire center sign construction, parts, combinations, and sub-combinations, which comprises the present invention, and the nature of which is set forth in the following general statement, and preferred embodiments of which, together with their mode of use, are set forth in the following description, which are particularly pointed out and set forth in the appended claims forming part hereof.

The nature of the improvements of the present invention may be described in general terms as constituting tire center sign construction consisting of a shell completely formed by a three-dimensionally curved one-piece wall having a uniform wall thickness of about 0.010 to 0.030 inch, and including a central disk which is externally convex and internally concave and which merges at its periphery in an annular rim.

The annular rim has a formation which is an outwardly opening deep U channel including an inner annular web, a rear annular flange extending outwardly from the rear border of the web, and a front annular flange extending outwardly from the front border of the web, the front annular flange including a reversely extending outer portion making junction with the disk periphery.

The one-piece three-dimensionally curved shell is made of distortable resilient material, such as vinyl plastic, which is preferably translucent or transparent.

The one-piece three-dimensionally curved shell, when used as a tire center sign, is adapted to be sprung or snapped into the center circular opening engirdled by the bead at either side of a motor car tire, and to automatically engage said bead. The tire may be a tubeless tire or a casing for an inner tube. The one-piece three-dimensionally curved shell sign is further adapted to be continuously or intermittently illuminated by a light or flasher unit located in the tire center opening adjacent the internal concave side of the central disk of the shell sign.

By way of example, preferred embodiments of the improved tire center sign construction and component parts of the present invention are illustrated in the accompanying drawings forming part hereof, in which Fig. 1 is a front elevational view of one of the improved tire center sign shells.

Fig. 2 is a a rear elevational view thereof, in the same scale as Fig. 1.

Fig. 3 is a side elevational view thereof, enlarged with respect to Figs. 1 and 2.

Fig. 4 is a fragmentary vertical sectional view thereof, as on line 4—4, Fig. 1, looking in the direction of the arrows, and enlarged with respect to Figs. 1, 2, and 3.

Similar numerals refer to similar parts throughout the several views.

Figure 7:
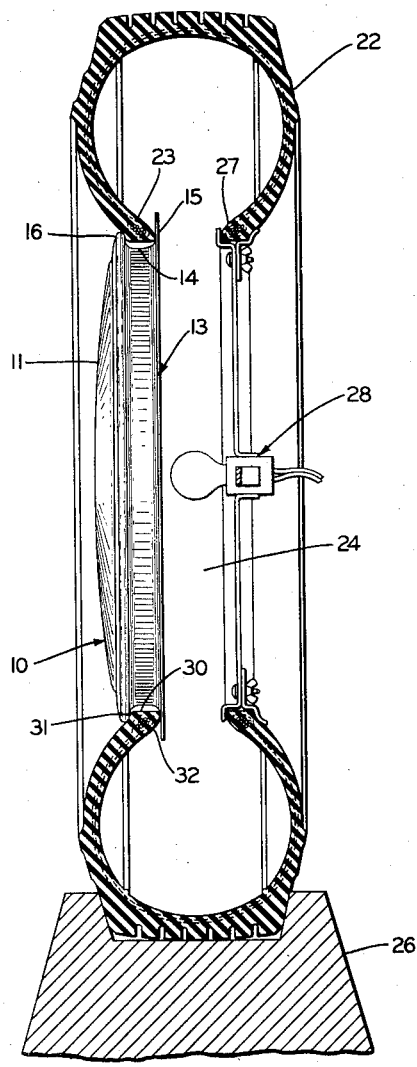
Fig. 7 is a vertical sectional view of another tire on another stand, showing one of the improved sign shells inserted in the tire center opening and engaged with the tire bead at one side of the tire, and a light or flasher unit engaged with the bead at the other side of the tire.

Preferred embodiments of the improved tire center sign shells, each indicated generally by 10 are shown in the drawings. In Figs. 1 to 4 inclusive, one of the improved tire center sign shells 10 is shown as a separate article of manufacture, before being installed in a tire. Each of the improved tire center sign shells 10 is completely formed by a three-dimensionally curved one-piece wall having a uniform wall thickness of about 0.010 to 0.030 inch, and includes a central disk 11 which is externally convex and internally concave and which merges at its circular periphery 12 with an annular rim indicated generally by 13.

The annular rim 13 has a formation which is an outwardly opening deep U channel, and includes an inner annular web 14, a rear annular flange 15, and a front annular flange 16.

The back face of the rear annular flange 15 is exposed in Fig. 2, and generally lies in the plane determined by the horizontal axis indicated in Fig. 2 by dot-dash line X intersecting at origin O the vertical axis indicated by the dot-dash line Y. The Y axis is also shown by the vertical dot-dash line in Fig. 3, and a third axis is indicated in Fig. 3 by the dot-dash line Z which passes through the origin O and is perpendicular to the X—Y plane.

The annular web 14 of the U channel rim 13 is generally cylindrical with respect to the Z axis. The rear annular flange 15 has a generally circular outer periphery with center O in the X—Y plane.

The front annular flange 16 includes an annular inner portion 17 which is substantially parallel with the rear annular flange 15. The front annular flange 16 furthermore includes an outer annular portion 18 which extends reversely from the inner annular portion 17 and makes a junction with the disk periphery 12.

There is a curved junction 19 between the rim web 14 and the rim rear flange 15 extending radially outwardly from the web. Similarly, there is a curved junction 20 between the rim web 14 and the front flange inner portion 17. Likewise, there is a curved junction 21 between the front flange inner portion 17 and the front flange reversely extending outer portion 18.

The rim web 14 has a one-dimensional curvature with respect to its cylindrical axis Z. Each of the junctions 19, 20, and 21 has a one-dimensional curvature with respect to the axis Z, and has a two-dimensional curvature in any radial plane passing through the Z axis.

The front annular flange reversely extending outer portion 18 has borders which are circular with respect to planes perpendicular to the Z axis, and the front annular flange reversely extending outer portion 18 is furthermore externally convex and internally concave, and the curvature of the external convex face of the front flange outer portion 18 and the curvature of the convex inner face thereof, are three-dimensional substantially spherical curvatures having centers on the Z axis.

Similarly, the external concave face of the central disk 11, and the internal convex face thereof, have spherical three-dimensional curvatures whose centers lie on the Z axis.

The Z axis is an axis of symmetry for the improved tire center sign shell 10, all the surfaces thereof as shown being surfaces of revolution with respect to the Z axis.

The improved tire center sign shell 10 is preferably made of vinyl plastic having a thickness of 0.015 inch, and is formed by heating and pressing operations from a flat sheet. The improved sign shell 10 when made of vinyl plastic, and when not under pressure maintains its formation as shown. The wall thickness of the sign shell 10 is such as to permit distortion of its various portions. It is noted that the front annular flange 16 including the flat annular inner portion 17 and the dished reversely extending outer portion 18, extends radially outwardly from the outer cylindrical face of the web 14 under one-half the distance that the rear single wall flat annular flange 15 extends radially from the outer cylindrical face of the annular web 14.

Any of the portions of the plastic wall of the sign shell 10 is resiliently distortable by application of pressure, resuming the conformation shown after being released from the application of pressure.

However, the single wall rear annular flange 15 is substantially more distortable than the radially shorter double wall front annular flange 16.

Accordingly, the sign shell 10 is distortable or deformable sufficiently by applying opposite hand pressure on the rim 13 to snap or spring the rim 13, from an exterior position, into the center opening of a tire, so that the rim engages one of the tire beads engirdling the center opening at one side of a tire.

Figure 5:
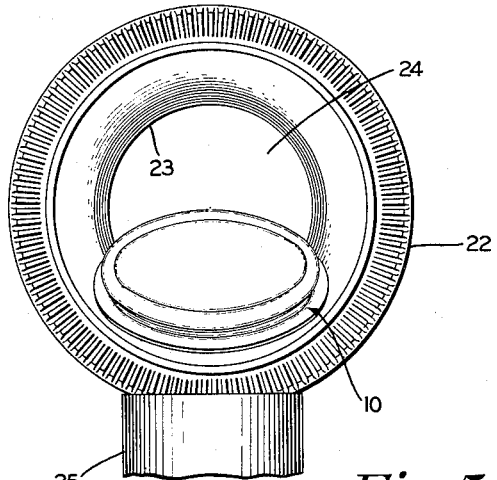
Fig. 5 is a front elevational view showing a tire on a stand, and one of the improved tire center sign shells lying in the tire center opening before being inserted therein.

In Fig. 5, there is shown a tire 22 having a tire bead 23 at one side engirdling the center opening 24 of the tire. The tire 22 is shown supported in an upright position on a display stand 25, and one of the improved tire center sign shells 10 is shown lying in an inclined position in the center opening 24 of the tire 22.

Figure 6:
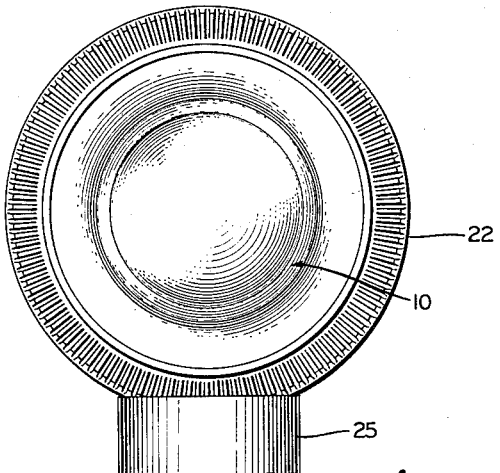
Fig. 6 is a view similar to Fig. 5, showing the tire after the improved sign shell has been snapped or sprung into the tire center opening.

In Fig. 6, the same tire 22 on the same display stand 25 is shown after the sign shell 10 shown in Fig. 5 has been sprung into engagement with the bead 23.

In Fig. 7, another tire 22 is shown on another display stand 26 with another sign shell 10 inserted in the tire center opening 24 and engaged with the tire bead 23.

The tire 22 shown in Fig. 7 also includes at its other side a tire bead 27 engirdling the tire opening 24, and a light unit indicated generally by 28 is engaged with the tire bead 27, whereby the translucent sign shell 10 engaged with the tire bead 23 may be illuminated from its rear side.

The light unit 28 may emit either a continuous light or be an intermittent flasher unit.

As set forth above, the improved sign shell 10 is preferably made of vinyl plastic material, or other plastic material.

As above stated, the sign shell 10 is symmetrical with respect to the Z axis, and accordingly may be made of spun aluminum or other spun material.

In such as case, where the thickness or physical properties of the wall of the improved sign shell 10 is such that there is insufficient distortability, deformability, or displaceability of the rim rear flange 15 and rim web 14 to permit insertion of the sign shell rim 11 into the center opening engirdled by a tire bead and to permit engagement of the rim 11 with the tire bead, then the flange 15 and web 14 may have slots 29 formed therein, such as shown by the short dash lines in Fig. 3.

The slotted rim 13 then has sufficient distortability to enable it to be sprung into the opening engirdled by a tire bead and to engage the bead.

Advertising copy is carried on the exposed face of the central disk 11 of the sign shell 10. The copy may be painted on or applied by the silk screen process. Portions of the disk 11 may be embossed with advertising copy letters and design elements, when desired.

In the combination, best shown in Fig. 7, of one of the sign shells 10 with its rim 13 engaged with one of the tire beads 23 of the tire 22, it is noted that the tire 22 has a cross section which is generally similar to a horse-shoe, and that each bead, such as the bead 23, is a ring having an inner cylindrical face 30, an outer annular side face 31 extending from the outer edge of the cylindrical face 30, and an inner angled side face 32 extending from the inner edge of the cylindrical face 30. When the sign shell 10 is inserted in the tire center opening 24 and has its rim 13 engaged with the ring bead 23, the rim front flange 16 abuts or is adjacent the front outer side face 31 of the bead 23, and the rim rear flange 15 abuts or is adjacent the inner edge of the inner cylindrical face 30 of the bead 23, and the outer face of the rim web 14 is displaced from the bead inner face 30.

I claim:

A shell adapted for use as a tire center sign, the shell having an axis of symmetry and being constituted by a three-dimensionally curved one-piece wall including a central disk having an outer face with a convex curvature and an inner face with a concave curvature, the curvatures of the disk faces having centers on the axis and the disk having a circular periphery having a center on the axis, and the disk periphery merging with an annular rim symmetrical with respect to the axis, the annular rim having a formation which is an outwardly opening U-channel including an inner annular web having a rear border and a front border, a rear annular flange extending radially from the rear web border, and a front annular flange including an inner portion extending outwardly from the front web border and a reversely extending outer portion making junction with the disk periphery, the rear annular flange having an outer radius greater than that of the front annular flange; and the shell wall being made of distortable resilient material.

References Cited in the file of this patent

UNITED STATES PATENTS

| | | |
|---|---|---|
| 1,625,798 | Doering et al. | Apr. 26, 1927 |
| 1,704,555 | Cluff | Mar. 5, 1929 |
| 1,755,427 | Cochran | Apr. 22, 1930 |
| 2,014,058 | Tonai | Sept. 10, 1935 |
| 2,629,957 | Lyon | Mar. 3, 1953 |

FOREIGN PATENTS

| | | |
|---|---|---|
| 137,890 | Austria | June 11, 1934 |